(12) United States Patent
Stamey, Jr. et al.

(10) Patent No.: US 11,400,396 B2
(45) Date of Patent: *Aug. 2, 2022

(54) FILTER ELEMENT WITH AIR-BLEED CONDUIT

(71) Applicant: MANN+HUMMEL Filtration Technology US LLC, Gastonia, NC (US)

(72) Inventors: Willie Luther Stamey, Jr., Kings Mountain, NC (US); Mark A. Roll, Bessemer City, NC (US); Gregory K. Rhyne, Stanely, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/072,604

(22) Filed: Oct. 16, 2020

(65) Prior Publication Data

US 2021/0031128 A1 Feb. 4, 2021

Related U.S. Application Data

(63) Continuation of application No. 14/885,081, filed on Oct. 16, 2015, now Pat. No. 10,807,026.

(51) Int. Cl.
*B01D 29/58* (2006.01)
*B01D 36/00* (2006.01)
(Continued)

(52) U.S. Cl.
CPC .......... *B01D 36/001* (2013.01); *B01D 29/15* (2013.01); *B01D 29/58* (2013.01); *B01D 35/005* (2013.01);
(Continued)

(58) Field of Classification Search
CPC ...... B01D 36/001; B01D 29/15; B01D 29/58; B01D 35/005; B01D 35/306;
(Continued)

(56) References Cited

U.S. PATENT DOCUMENTS 3,167,507 A 1/1965 Burhans
5,413,711 A 5/1995 Janik
(Continued)

FOREIGN PATENT DOCUMENTS

CN 103458985 A 12/2013
DE 102009025393 A1 12/2010

OTHER PUBLICATIONS

German office action for the related application No. 102016119504.9 dated Feb. 26, 2018.
(Continued)

*Primary Examiner* — Waqaas Ali
(74) *Attorney, Agent, or Firm* — Honigman LLP

(57) ABSTRACT

A filter element includes a first end cap, a second end cap, and an intermediate end cap disposed between the first end cap and the second end cap. A ring of first filter media circumscribing a first central cavity is disposed between the first end cap and the intermediate end cap. A ring of second filter media is disposed between the intermediate end cap and the second end cap. The filter element also includes an air-bleed conduit axially extending through the first central cavity and comprising a first portion integrally formed with
(Continued)

the first end cap and a second portion integrally formed with the intermediate end cap and configured to connect to the first portion thereby forming a conduit for transmitting fluid.

20 Claims, 5 Drawing Sheets

(51) Int. Cl.
      *B01D 29/15*     (2006.01)
      *B01D 35/00*     (2006.01)
      *B01D 35/30*     (2006.01)

(52) U.S. Cl.
      CPC ...... *B01D 35/306* (2013.01); *B01D 2201/291* (2013.01); *B01D 2201/305* (2013.01); *B01D 2201/306* (2013.01); *B01D 2201/316* (2013.01); *B01D 2201/4038* (2013.01)

(58) Field of Classification Search
      CPC ........ B01D 2201/291; B01D 2201/305; B01D 2201/306; B01D 2201/316; B01D 2201/4038; B01D 29/50; B01D 29/88; B01D 35/00; B01D 2201/0415
      See application file for complete search history.

(56) References Cited

U.S. PATENT DOCUMENTS 10,807,026 B2 * 10/2020 Stamey, Jr. .......... B01D 35/306
11,035,330 B2 * 6/2021 Stamey, Jr. .......... B01D 36/001

OTHER PUBLICATIONS

Chinese Office Action for the related Application No. 201610903581.9 dated Jul. 15, 2018.
U.S. Patent and Trademark Office Non-Final Ofice Action dated Oct. 2, 2017, relating to U.S. Appl. No. 14/885,081.
U.S. Patent and Trademark Office Non-Final Office Action dated May 15, 2018, relating to U.S. Appl. No. 14/885,081.
U.S. Patent and Trademark Office Final Office Action dated Feb. 5, 2019, relating to U.S. Appl. No. 14/885,081.
U.S. Patent and Trademark Office Non-Final Office Action dated May 15, 2019, relating to U.S. Appl. No. 14/885,081.
U.S. Patent and Trademark Office Ex Parte Quayle Office Action dated Feb. 4, 2020, relating to U.S. Appl. No. 14/885,081.

* cited by examiner

FILTER ELEMENT WITH AIR-BLEED CONDUIT

CROSS REFERENCE TO RELATED APPLICATION

This U.S. patent application is a continuation of, and claims priority under 35 U.S.C. § 120 from, U.S. patent application Ser. No. 14/885,081, filed on Oct. 16, 2015. The disclosure of this prior application is considered part of the disclosure of this application and is hereby incorporated by reference in its entirety.

TECHNICAL FIELD

This disclosure relates to fuel filter assemblies, and more particularly to a filter element of a filter assembly having an air-bleed conduit for venting air trapped within a filter housing of the filter assembly.

BACKGROUND

Filter assemblies may be used in fuel systems to remove particulates within a fuel stream between a fuel tank and an engine and/or other components. For example, a pump may move the fuel through the system from the fuel tank to the engine. The filter assembly may include a filter element disposed downstream of the pump to remove the particulates from the fuel prior to delivery to the engine and/or other downstream components. The filter element may additionally remove particulates from injector-bled fuel prior routed to back to the fuel assembly. While changing filters, or during operation of the system, air may be introduced into the filter assembly. The air may create back pressure that inhibits the ability for unfiltered fuel to be pushed through the filter element for filtering. Additionally, the air may pass through the filter element, and consequently create erratic fuel delivery, thereby effecting performance of the downstream components.

It is known, to use vents or air passages for venting or bleeding out air within filter assemblies. Conventionally, these air passages are disposed radially outward of filter media and define vent openings spaced between inner surfaces of top and intermediate end caps of the filter element. While locating the conventional air passages in this manner simplifies the ability to incorporate the air passages into the filter element during assembly, such air passages are ineffective for allowing air that has become trapped between the top end cap and the top of the filter housing to be vented out of the filter assembly.

SUMMARY

One aspect of the disclosure provides a filter element includes a first end cap, a second end cap, and an intermediate end cap disposed between the first end cap and the second end cap. A ring of first filter media circumscribing a first central cavity is disposed between the first end cap and the intermediate end cap. A ring of second filter media is disposed between the intermediate end cap and the second end cap. The filter element also includes an air-bleed conduit axially extending through the first central cavity and comprising a first portion integrally formed with the first end cap and a second portion integrally formed with the intermediate end cap and configured to connect to the first portion thereby forming a conduit for transmitting fluid.

Implementations of the disclosure may include one or more of the following optional features. In some implementations, a sum of axial lengths of the first portion and the second portion is greater than an axial distance between the first end cap and the intermediate end cap. The axial length of the first portion may be greater than an axial distance between the first end cap and the intermediate end cap.

In some examples, the second portion fluidly connects to the first portion when a receiving passage defined by an inner surface of one of the first portion or the second portion receives an outer surface of the other one of the first portion or the second portion. The receiving passage of the one of the first portion or the second portion may include a frusto-conical tapered section and the outer surface of the other one of the first portion or the second portion may include an intermediate frusto-conical section having a geometry configured to insert into and seal against the frusto-conical tapered section of the receiving passage to fluidly connect the second portion to the first portion when the receiving passage of the one of the first portion or the second portion receives the outer surface of the other one of the first portion or the second portion. In some configurations, one or more interference members protrude radially inward from the inner surface defining the receiving passage of the one of the first portion or the second portion or protrude radially outward from the outer surface of the other one of the first portion or the second portion received by the receiving passage. In these configurations, one or more receiving slots may be formed within the other one of the inner surface defining the receiving passage or the outer surface received by the receiving passage and configured to receive corresponding ones of the interference members to prevent the first portion and the second portion from moving relative to each other when the receiving passage of the one of the first portion or the second portion receives the outer surface of the other one of the first portion or the second portion.

In some implementations, the first portion axially extends from an inlet formed through the first end cap to a first distal end defining a distal opening in fluid communication with the inlet. In these implementations, the receiving passage is defined by the inner surface of the second portion that axially extends between an inner opening defined by a second distal end of the second portion and an outer opening extending through the intermediate end cap. The first distal end of the first portion may be disposed within the receiving passage of the second portion or may axially extend through the outer opening of the receiving passage. In some examples, the outer opening of the receiving passage is disposed between the intermediate end cap and the second end cap. In other examples, the outer opening of the receiving passage is formed through the intermediate end cap.

In some implementations, the first portion axially extends from an inlet formed through the first end cap to a first distal end defining a first distal opening in fluid communication with the inlet, and the inner surface of the first portion defines the receiving passage extending axially from the first distal opening toward the inlet. In these implementations, the second portion axially extends from an outer opening extending through the second end cap to a second distal end. The second distal end may be disposed within the receiving passage of the first portion and define an inner opening that provides fluid communication with the inlet formed through the first end cap and the outer opening extending through the second end cap when the first portion and the second portion are fluidly connected.

In some configurations, the filter element also includes an annular sealing device extending axially from an outer surface of the intermediate end cap toward the second end cap. In these configurations, the annular sealing device defines a vented fluid chamber in direct fluid communication with the air-bleed conduit. The filter element may also optionally include a support core disposed in the first central cavity of the first filter media and supporting a first inner periphery associated with the first filter media, wherein the air-bleed conduit is disposed radially inward from the support core and a second inner periphery associated with the second filter media Another aspect of the disclosure provides a filter assembly including a filter housing defining an internal chamber between a first end and a second end, and a filter element disposed within the internal chamber of the filter housing. The filter element includes a first end cap opposing the first end of the filter housing, a second end cap opposing the second end of the filter housing, and an intermediate end cap disposed between the first end cap and the second end cap. The filter element also includes a ring of first filter media axially extending between the first end cap and the intermediate end cap and circumscribing a first central cavity. A ring of second filter media axially extends between the intermediate end cap and the second end cap and circumscribes a second central cavity. The filter element also includes a male portion of an air-bleed conduit having a first proximal end integrally formed with the first end cap to define an inlet formed through the first end cap, and a female portion of the air-bleed conduit fluidly connected to the male portion and integrally formed with the intermediate end cap to define an outer opening extending through the intermediate end cap.

This aspect may include one or more of the following optional features. In some implementations, the male portion and the female portion are coaxial and disposed radially inward from inner peripheries of the first and second filter media. The female portion may define a receiving passage axially extending between the outer opening and an inner opening disposed between the first end cap and the intermediate end cap. Here, the receiving passage receives and forms a seal with an outer surface of the male portion In some configurations, the filter element also includes an annular sealing device extending axially from an outer surface of the intermediate end cap toward the second end cap and defining a vented fluid chamber in fluid communication with the air-bleed conduit. In these configurations, the air-bleed conduit is configured to receive fluid through the inlet formed through the first end cap and direct the received fluid to the vented fluid chamber. In some examples, the first filter media is defined by a first outer periphery opposing the internal chamber of the housing and a first inner periphery disposed radially inward from the first outer periphery and opposing the first central cavity. The first central cavity may receive filtered fuel upon passing through the first filter media at the first outer periphery and exiting at the first inner periphery. In some examples, the second filter media is defined by a second outer periphery opposing the internal chamber of the housing and a second inner periphery disposed radially inward from the second outer periphery and opposing the second central cavity. The internal chamber of the housing may receive filtered injector-bled fuel upon passing through the second filter media at the second inner periphery and exiting at the second outer periphery. The filtered fuel passed through the first filter media may correspond to at least one of unfiltered fuel from a fuel system in fluid communication with the internal chamber of the housing or the filtered injector-bled fuel exiting the second filter media at the second outer periphery.

Yet another aspect of the disclosure provides a method of manufacturing a filter element. The method includes integrally forming a first end cap with a first portion of an air-bleed conduit, providing a second end cap, and integrally forming an intermediate end cap with a second portion of the air-bleed conduit. The first portion axially extends from an inlet formed through the first end cap to a first distal end defining a first distal opening. The second portion axially extends from an outer opening extending through the intermediate end cap to a second distal end defining an inner opening. The method also includes providing a ring of first filter media circumscribing a first central cavity and extending axially between a first top end and a first bottom end, and providing a ring of second filter media circumscribing a second central cavity and extending axially between a second top end and a second bottom end. The method also includes affixing one of the intermediate end cap to the first bottom end of the first filter media or the first end cap to the first top end of the first filter media, fluidly connecting the first portion and the second portion of the air-bleed conduit together, and affixing the other one of the first end cap to the first top end of the first filter media or the intermediate end cap to the first bottom end of the first filter media. The method also includes affixing the second bottom end of the second filter media to the second end cap and the second top end of the second filter media to the intermediate end cap. The second top end of the second filter media is affixed to the intermediate end cap on an opposite side of the intermediate end cap than the first bottom end of the first filter media.

In some examples, the step of fluidly connecting the first portion and the second portion of the air-bleed conduit together includes, when the intermediate end cap is affixed to the first bottom end of the first filter media with the second portion of the air-bleed conduit extending axially into the first central cavity, positioning the first end cap to place the first portion of the air-bleed conduit in coaxial alignment with the second portion of the air-bleed conduit. The method may also include inserting one of the first distal end of the first portion into the inner opening of the second portion or the second distal end of the second portion into the first distal opening of the first portion and pressing the first portion and the second portion of the air-bleed conduit together to form a seal between an outer surface of the first portion and an inner surface of the second portion or between an inner surface of the first portion and an outer surface of the second portion.

In some implementations, the method also includes affixing an annular sealing device to the intermediate end cap on an opposite side of the intermediate end cap than the first filter media. In these implementations, the affixed annular sealing device defines a vented air chamber configured to receive fluid vented through the air-bleed conduit from the inlet formed through the first end cap.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
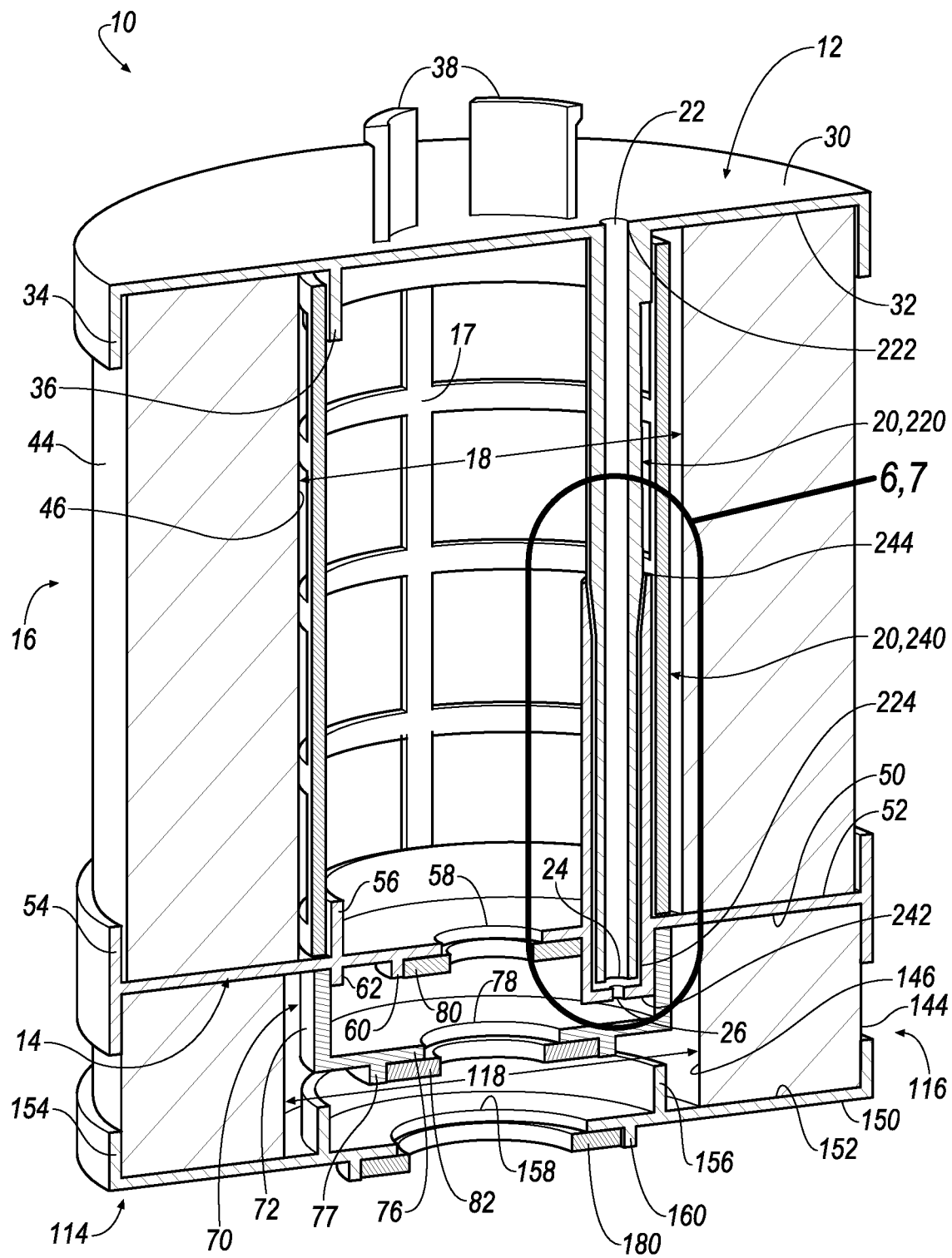
FIG. 1 is an isometric cross-sectional view of an example filter element having two coaxial rings of filter media and an air-bleed conduit.
Figure 2:
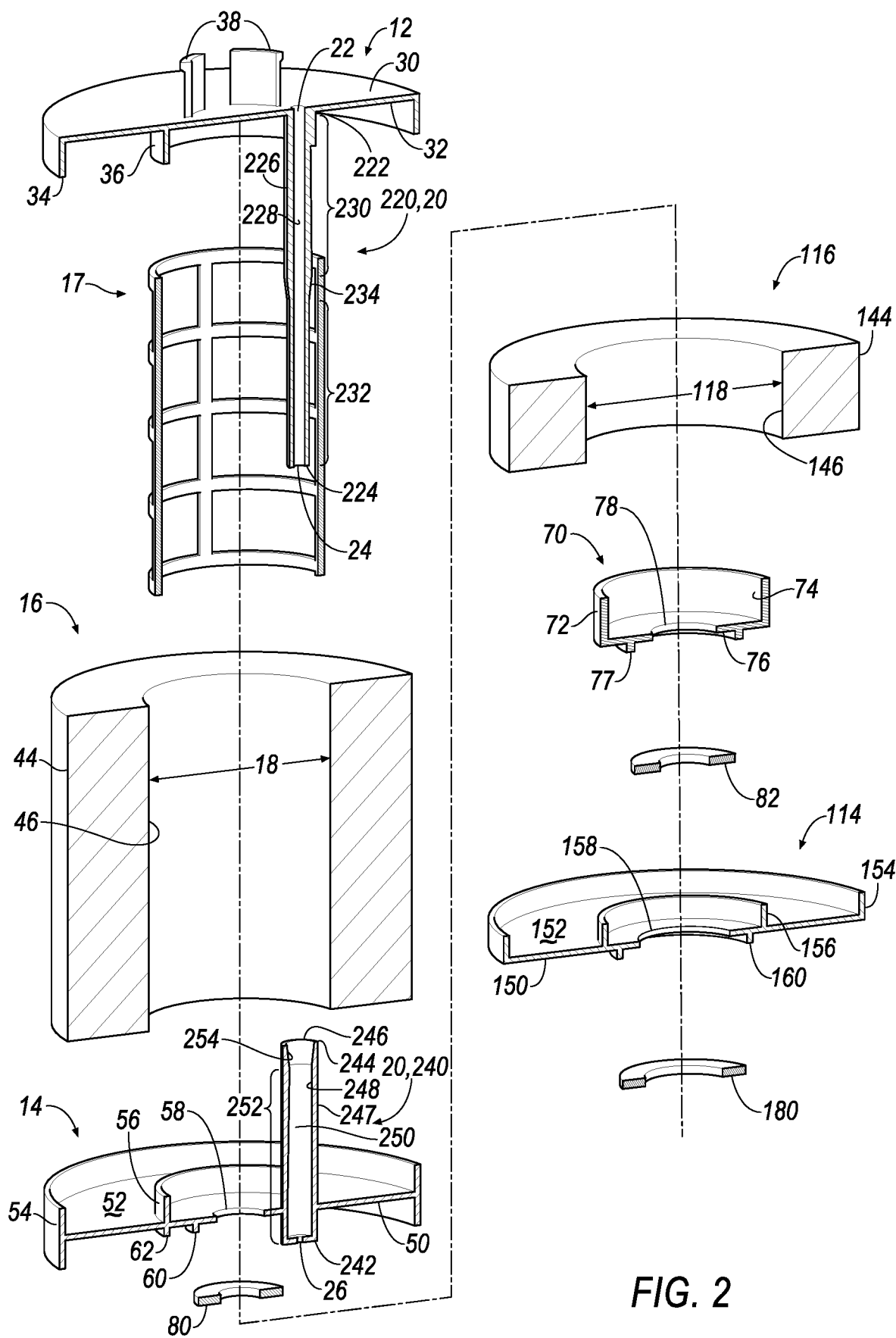
FIG. 2 is an exploded view of the filter element of FIG. 1
Figure 3:
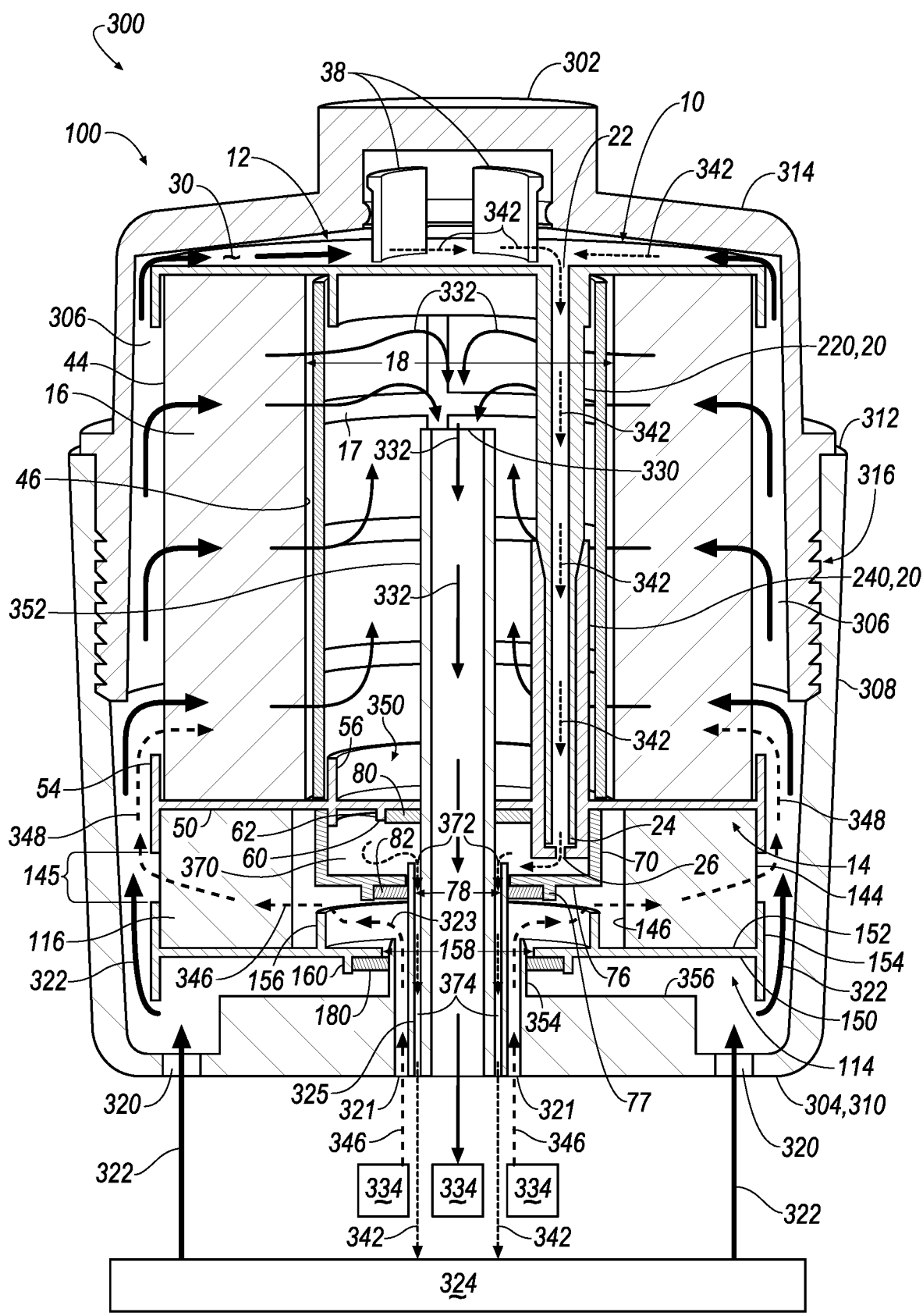
FIG. 3 is a schematic cross-sectional view of a filter assembly including a filter housing and the filter element of FIG. 1 disposed within the filter housing.

Referring to FIGS. 1 and 2, in some implementations, a filter element 10 for a fuel system includes a first end cap 12, a second end cap 114 opposing the first end cap 12, and an intermediate end cap 14 opposing and disposed in between the first end cap 12, and the second end cap 114. The filter element 10 may also include a first ring of filter media 16 and a second ring of filter media 116. The first ring of filter media 16 is disposed between the first end cap 12 and the intermediate end cap 14 and circumscribes a first central cavity 18. The second ring of filter media 116 is disposed between the intermediate end cap 14 and the second end cap 114 and circumscribes a second central cavity 118. An air-bleed conduit 20 axially extends through the first central cavity 18. In some examples, the air-bleed conduit 20 axially extends through a portion of the second central cavity 118. Described in greater detail below with reference to FIG. 3, the air-bleed conduit 20 facilitates bleeding or venting of air residing within a filter housing 100 (FIG. 3). The accumulation of trapped air may cause the air to be pushed through the first ring of filter media 16, and thereby impact fuel delivery, and adversely affect performance of components downstream of the filter element 10. Accordingly, the air-bleed conduit 20 may vent trapped air out of the filter housing 100 for return back to a fuel supply, fuel reservoir, or the like 324 (FIG. 3). In some examples, the air-bleed conduit 20 includes a first portion 220 integrally formed with the first end cap 12 and a separate second portion 240 integrally formed with the intermediate end cap 14. The first portion 220 and the second portion 240 are configured to fluidly connect with each other during assembly of the filter element 10 to form the air-bleed conduit 20 as a single member extending axially through at least the first central cavity 18. In the views of FIGS. 1-3, the first end cap 12 is associated with the top end cap affixing to a top end of the first ring of filter media 16, the intermediate end cap 14 is associated with the middle end cap affixing to a bottom end of the first ring of filter media 16 disposed on an opposite side of the filter media 16 than the top end and also affixing to a top end of the second ring of filter media 116 on an opposite side of the intermediate end cap 14 than the bottom end of the first ring of filter media 16, and the second end cap 114 is associated with the bottom end cap affixing to a bottom end of the second ring of filter media 116 disposed on an opposite side of the second ring of filter media 116 than top end. The filter medias 16, 116 may be formed from one or more materials having an efficiency and structure suitable for the particular application. The filter medias 16, 116 may include the same or different capacities, efficiencies, and/or structures for filtering out particulates within fuel passing therethrough.

In some examples, the first end cap 12 includes an outer surface 30 and an inner surface 32 disposed on an opposite side of the end cap 12 than the outer surface 30. The first end cap 12 may include a first outer peripheral wall 34 and a first inner peripheral wall 36 disposed radially inward from the first outer peripheral wall 34. In some implementations, the inner surface 32 of the first end cap 12 affixes to the top end of the first filter media 16 between the first outer peripheral wall 34 and the first inner peripheral wall 36. The inner surface 32 may affix and sealingly bond to the first filter media 16 using potting compounds, such as Plastisol, urethanes, or other suitable adhesives. The first outer peripheral wall 34 extends axially downward or away from the first end cap 12 toward the intermediate end cap 14 to outwardly bound an outer periphery 44 of the first filter media 16. Similarly, the first inner peripheral wall 36 may extend axially downward or away from the first end cap 12 toward the intermediate end cap 14 to inwardly bound an inner periphery 46 of the first filter media 16. The first end cap 12 may also include one or more fastening members 38 projecting axially upward from the outer surface 30 for fastening the filter element 10 with the filter housing 100.

In some implementations, the first end cap 12 is integrally formed with the first portion 220 of the air-bleed conduit 20. The first end cap 12 and the first portion 220 may be generally, simultaneously formed from any conventional material, such as metal or plastic, during a single forming process (e.g., an injection molding process). The first portion 220 may extend axially between a first proximal end 222 disposed at the first end cap 12 and a first distal end 224 disposed closer to the intermediate end cap 14 than the first end cap 12. The first proximal end 222 of the first portion 220 may define an inlet 22 formed through the outer surface 30 and the inner surface 32 of the first end cap 12. The inlet 22 may include an orifice having a size and shape configured to permit unfiltered air trapped axially above the outer surface 30 of the first end cap 12 to enter the first portion 220 of the air-bleed conduit 20, while preventing significant volumes of fluid from entering the air-bleed conduit 20 through the inlet 22. Additionally, a screen or other perforated material may cover the inlet 22 to block fluid and/or particulate matter from entering the air-bleed conduit 20 through the inlet 22. The first distal end 224 of the first portion 220 may define a first distal opening 24. The example of FIG. 1 shows the first distal end 224 of the first portion 220 extending through and protruding away from the intermediate end cap 14. In this example, the first distal opening 24 directly fluidly communicates with the inlet 22 formed through the first end cap 22 to release air bled through the air-bleed conduit 20. In other examples, however, the first distal end 224 of the first portion 220 may terminate within the second portion 240 of the air-bleed conduit 20, and therefore, axially above the intermediate end cap 14.

In some examples, the intermediate end cap 14 includes an outer surface 50 and an inner surface 52 disposed on an opposite side of the intermediate end cap 14 than the outer surface 50. The intermediate end cap 14 may include an intermediate outer peripheral wall 54 and an intermediate inner peripheral wall 56 disposed radially inward from the intermediate outer peripheral wall 54. In some implementations, the inner surface 52 of the intermediate end cap 14 affixes to the bottom end of the first filter media 16 between the intermediate outer peripheral wall 54 and the intermediate inner peripheral wall 56 on an opposite side of the first filter media 16 than the first end cap 12. The inner surface 52 may affix and sealingly bond to the first filter media 16 using potting compounds, such as Plastisol, urethanes, or other suitable adhesives. The intermediate outer peripheral wall 54 extends axially upward or away from the intermediate end cap 14 toward the first end cap 12 to outwardly bound the outer periphery 44 of the first filter media 16. Similarly, the intermediate inner peripheral wall 56 may extend axially upward or away from the intermediate end cap 14 toward the first end cap 12 to inwardly bound the inner periphery 46 of the first filter media 16. The intermediate end cap 14 may also define a centrally located inner standpipe opening 58.

Where the inner surface 52 of the intermediate end cap 14 affixes to the bottom end of the first filter media 16, the outer surface 50 of the intermediate end cap 14 affixes to the top end of the second filter media 116 between the intermediate outer peripheral wall 54 and the intermediate inner peripheral wall 56. With similar respect to the inner surface 52 and the first filter media 16, the outer surface 50 may affix and sealingly bond to the second filter media 116 using potting compounds, such as Plastisol, urethanes, or other suitable adhesives. The intermediate outer peripheral wall 54 extends axially downward or away from the intermediate end cap 14 toward the second end cap 114 to outwardly bound the outer periphery 144 of the second filter media 116. Similarly, the first intermediate inner peripheral wall 56 may extend axially downward or away from the intermediate end cap 14 toward the second end cap 114 to inwardly bound the inner periphery 146 of the second filter media 116.

In some implementations, the intermediate end cap 14 is integrally formed with the second portion 240 of the air-bleed conduit 20. The intermediate end cap 14 and the second portion 240 may be generally, simultaneously formed from any conventional material, such as metal or plastic, during a single forming process (e.g., an injection molding process). The second portion 240 may extend axially between a second proximal end 242 disposed proximate to the intermediate end cap 14 and a second distal end 244 defining an inner opening 246. The second proximal end 242 may define an outer opening 26 extending through the outer surface 50 and the inner surface 52 of the intermediate end cap 14. While the examples of FIGS. 1-3 show the second distal end 244 protruding away from the outer surface 50 of the intermediate end cap 14, and thus disposed axially between the intermediate end cap 14 and the second end cap 114, the second distal end 244 may be disposed at the intermediate end cap 14 such that the outer opening 26 is formed through the outer surface 50 and the inner surface 52 of the intermediate end cap 14. In some examples (not shown), the outer opening 26 may have a size and shape configured to permit the first distal end 224 of the first portion 220 to extend therethrough. In other examples (not shown), when the first distal end 224 of the first portion 220 is disposed within the second portion 240 and axially above the intermediate end cap 14, the outer opening 26 fluidly communicates with the inlet 22 formed through the first end cap 12 to release the air bled or vented through the air-bleed conduit 20.

The intermediate end cap 14 may also include a first annular retaining wall 60 and a second annular retaining wall 62 each extending axially downward or away from the outer surface 50. The first annular retaining wall 60 may be disposed radially outward from the inner standpipe opening 58 and the second annular retaining wall 62 may be disposed radially outward from the first annular retaining wall 60. The outer opening 26 extending through the intermediate end cap 14 may be disposed between the first annular retaining wall 60 and the second annular retaining wall 62, or defined in part by the first annular retaining wall 60 and the second annular retaining wall 62.

In some implementations, an annular sealing device 70 is disposed on the outer surface 50 of the intermediate end cap 14. The annular sealing device 70 may be integral to the intermediate end cap 14 or separately attached. The sealing device 70 includes an outer surface 72 extending axially downward or away from the outer surface 50 and toward the second end cap 114. An inner surface 74 of the annular sealing device 70 may outwardly bound the second annular retaining wall 62 of the intermediate end cap 14 and may include an inner lip 76 that extends radially inward therefrom to form a surface displaced from the planar extent of outer surface 50 of the intermediate end cap 14 and define an intermediate standpipe opening 78. In other configurations (not shown), the second annular retaining wall 62 of the intermediate end cap 14 may outwardly bound the outer surface 72 of the annular sealing device 70. The annular sealing device 70 may also include a third annular retaining wall 77 extending axially downward or away from the inner lip 76 and toward the second end cap 114. The third annular retaining wall 77 may be disposed radially between the intermediate standpipe opening 78 and the inner surface 74 of the annular sealing device 70. In some examples, a first annular seal 80 is disposed on the outer surface 50 and bounded by the first annular retaining wall 60 to provide a seal between a standpipe assembly 350 (FIG. 3), the intermediate end cap 14, and the sealing device 70 at the inner standpipe opening 58. A second annular seal 82 may be bounded by the third annular retaining wall 77 and disposed axially below and in contact with the inner lip 76 of the annular sealing device 70. The second annular seal 82 may provide a seal between the standpipe assembly 350 and the annular sealing device 70 at the intermediate standpipe opening 78. Described in greater detail below with reference to FIG. 3, the standpipe assembly 350, the inner surface 74 of the sealing device 70, the first annular seal 80, the second annular seal 82, and the bottom surface 50 of the intermediate end cap 14, may cooperate to define a vented air chamber 370 in direct fluid communication with the air-bleed conduit 20.

In some implementations, the second end cap 114 includes an outer surface 150 and an inner surface 152 disposed on an opposite side of the second end cap 114 than the outer surface 150. The second end cap 114 may include a second outer peripheral wall 154 and a second inner peripheral wall 156 disposed radially inward from the second outer peripheral wall 154. In some implementations, the inner surface 152 of the second end cap 114 affixes to the bottom end of the second filter media 116 between the second outer peripheral wall 154 and the second inner peripheral wall 156 on an opposite side of the second filter media 116 than the intermediate end cap 14. The inner surface 152 may affix and sealingly bond to the bottom end of the second filter media 116 using potting compounds, such as Plastisol, urethanes, or other suitable adhesives. The second outer peripheral wall 154 extends axially upward or away from the second end cap 114 toward the intermediate end cap 14 to outwardly bound the outer periphery 144 of the second filter media 116. Similarly, the second inner peripheral wall 156 may extend axially upward or away from the second end cap 114 toward the intermediate end cap 14 to inwardly bound the inner periphery 146 of the second filter media 116. The second end cap 114 may also define a centrally located outer standpipe opening 158 coaxial with the intermediate standpipe opening 78 and the inner standpipe opening 58. Described in greater detail below with reference to FIG. 3, a distal end of the second inner peripheral wall 156 and the inner lip 76 of the annular sealing device 70 define a gap that permits injector-bled fuel 346 (FIG. 3) to pass therethrough for subsequent filtering by the second filter media 116 upon passing through second filter media 116 at the second inner periphery 146 and exiting at the second outer periphery 144 as filtered injector-bled fuel 348 (FIG. 3).

The second end cap 114 may also include a fourth annular retaining wall 160 extending axially downward or away from the outer surface 150. The fourth annular retaining wall 160 may be disposed radially outward from the outer standpipe opening 158. A third annular seal 180 may be bounded by the fourth annular retaining wall 160 and disposed axially below and in contact with the outer surface 150 of the second end cap 114. The third annular seal 180 may provide a seal between the standpipe assembly 350 and the second end cap 114 at the outer standpipe opening 158.

In some implementations, the filter element 10 optionally includes a support core 17 configured to support the first filter media 16 at the inner periphery 46. The support core 17 may extend axially along the entire length of the first filter media 16 and define a plurality of passages configured to allow filtered fuel 332 (FIG. 3) to flow into the central cavity 18 after passing through the first filter media 16. The air-bleed conduit 20 may be separate from the support core 17 and disposed radially inward therefrom.

Referring to FIG. 2, an exploded view of the filter element 10 of FIG. 1 shows the first portion 220 of the air-bleed conduit 20 integrally formed with the first end cap 12 and the second portion 240 of the air-bleed conduit 20 integrally formed with the intermediate end cap 14. A sum of the axial lengths of the first portion 220 and the second portion 240 may be greater than an axial distance between the first end cap 12 and the intermediate end cap 14. In some examples, the first portion 220 includes an axial length greater than the axial distance between the first end cap 12 and the intermediate end cap 14. However, in other examples (FIGS. 6 and 7), the axial length of the first portion 220 may be less than the axial distance between first end cap 12 and the intermediate end cap 14.

The first portion 220 may include an outer surface 226 and an inner surface 228 that defines a passage for the flow of air between the inlet 22 and the outer opening 26 extending through the intermediate end cap 14 (and/or the first distal opening 24). In some implementations, the outer surface 226 may include an exposed section 230 axially extending from the first proximal end 222, an insertion section 232 associated with the first distal end 224 and having an insertion diameter smaller than a diameter of the exposed section 230, and an intermediate frusto-conical section 234 interconnecting the exposed section 230 with the insertion section 232.

The second portion 240 may include an outer surface 247 and an inner surface 248 that defines a receiving passage 250 axially extending between the inner opening 246 and the outer opening 26 extending through the intermediate end cap 14. The receiving passage 250 may receive the outer surface 226 of the first portion 220 to fluidly connect the first portion 220 and the second portion 240 together during assembly of the filter element 10, and thereby form the air-bleed conduit 20 as a single integral member extending axially at least through the first central cavity 18 of the filter element 10. As used herein, the air-bleed conduit 20 extending axially through the central cavity 18 refers to the air-bleed conduit 20 extending axially through the inlet 22 formed through the first end cap 12, the first central cavity 18, and the outer opening 26 extending through the second end cap 14. FIGS. 1 and 3 show an example configuration with the outer opening 26 extending through the intermediate end cap 14 to a location axially displaced between the intermediate end cap 14 and the second end cap 114. In other configurations, however, the outer opening 26 extending through the intermediate end cap 14 may be formed through the intermediate end cap 14.

The receiving passage 250 may include a uniform section 252 having a receiving diameter smaller than a diameter of the inner opening 246. In some examples, a frusto-conical tapered section 254 interconnects the inner opening 246 with the uniform section 252. During assembly of the filter element 10, the intermediate end cap 14 may affix to the bottom end of the first filter media 16 such that the second portion 240 of the air-bleed conduit 20 extends axially upward and into the first central cavity 18. Prior to affixing the first end cap 12 to the top end of the first filter media 16, the first portion 220 of the air-bleed conduit 20 must be positioned in coaxial alignment with the second portion 240 so that the insertion section 232 of the first portion 220 may be inserted into the receiving passage 250 of the second portion 240. Here, tapered edges of the frusto-conical tapered section 254 may assist in aligning and guiding the insertion section 232 of the first portion 220 into the receiving passage 250 to fluidly connect the first portion 220 and the second portion 240 together when the portions 220, 240 are axially pressed together. The first portion 220 and the second portion 240 may fluidly connect together by a compression fit and/or other fastening members associated with the first and second portions 220 and 240. Thereafter, to complete assembly of the filter element 10, the intermediate end cap 14 may affix to the top end of the second filter media 116 and the second end cap 114 may affix to the bottom end of the second filter media 116. In some examples, second portion 240 of the air-bleed conduit 20 also axially extends downward and into the second central cavity 118 such that the second proximal end 242 defining the outer opening 26 is disposed within the second central cavity 118 radially inward from the inner periphery 146 of the second filter media 116.

In some implementations, the frusto-conical tapered section 254 of the receiving passage 250 includes a geometry configured to receive and seal against the intermediate frusto-conical section 234 of the outer surface 226 of the first portion 220 to fluidly connect the first portion 220 and the second portion 240 when the uniform section 252 of the receiving passage 250 receives the insertion section 232 of the first portion 220. FIGS. 1 and 3 show the first portion 220 and the second portion 240 fluidly connected such that the frusto-conical tapered section 254 and the intermediate frusto-conical section 234 form a seal with the first distal end 224 defining the first distal opening 24 coaxial with and adjacent to the outer opening 26 extending through the intermediate end cap 14. Accordingly, the first distal opening 24 directly fluidly communicates with the inlet 22 formed through the first end cap 12 and the outer opening 26 extending through the intermediate end cap 14 to release the air bled or vented through the air-bleed conduit 20. In other implementations, the first distal end 224 defining the first distal opening 24 may axially extend through the outer opening 26 such that the first distal opening 24 is exposed from the receiving passage 250 and protruding away from the outer opening 26 within the second central cavity 118. In these implementations, the first distal opening 24 directly fluidly communicates with the inlet 22 formed through the first end cap 12 to release the air bled or vented through the air-bleed conduit 20.

In some implementations, the geometry of the first portion 220 and the second portion 240 may be reversed without limitation to allow the inner surface 228 of the first portion 220 to define a receiving passage 750 (FIG. 7) configured to receive the outer surface 247 of the second portion 240, and thereby fluidly connect the first portion 220 and the second portion 240 together. Here, the inner opening 246 of the second portion 240 may be disposed within the receiving passage 750 of the first portion 220.

In other configurations, rather than being integrally formed with respective ones of the first end cap 12 or the intermediate end cap 14, at least one of the first portion 220 or the second portion 240 of the air-bleed conduit 20 may be formed independently from the respective one of the first end cap 12 or the second end cap 14. For instance, the first end cap 12 may be formed to define the inlet 22 therethrough and the first proximal end 222 of the first portion 220 may be mounted or attached to the inner surface 32 of the first end cap 12. Similarly, the intermediate end cap 14 may be formed to define the outer opening 26 therethrough and the second proximal end 242 of the second portion 240 may be mounted or attached to the inner surface 52 of the second end cap 14.

Referring to FIG. 3, in some implementations, a filter assembly 300 includes the filter housing 100 and the filter element 10 cooperating to remove particulates from a fuel stream 322 and also injector-bled fuel 346 in a fuel system. For example, the filter assembly 300 may be located downstream, on a pressure side of a fuel supply 324 (e.g., a pump and/or fuel tank for moving fuel through the system, e.g., from the fuel tank to an engine 334. Moreover, the filter assembly 300 may receive injector-bled fuel 346 returned from the engine 334 (e.g., fuel injection pump and/or fuel rail). Specifically, the injector-bled fuel 346 refers to excess fuel that was previously delivered to fuel injectors (e.g., via a fuel rail) for delivery of the fuel at elevated pressures to cylinders of the engine 334. In some implementations, the injector-bled fuel 346 bypasses the fuel supply 324, and is instead returned back to the filter assembly 300 for filtering before being delivered as filtered fuel 332 back to the engine 334.

The filter housing 100 (hereinafter 'housing') defines an internal chamber 306 between a first end 302 and a second end 304, and the filter element 10 is received within the internal chamber 306. The housing 100 may include a cylindrical canister 308 having a bottom, closed end 310 associated with the second end 304 of the housing 100, and a top, open end 312. A cover 314 may attach to the open end 312 of the canister 308 to define the internal chamber 306 of the housing 100. Threads 316 may be provided between the canister 308 and the cover 314 to allow the cover 314 to be releasably fastened to the canister 308. The canister 308 may define one or more inlet fuel ports 320 to direct unfiltered fuel 322 from the fuel supply 324 into the internal chamber 306 of the housing 100 to be filtered. The fuel supply 324 may include a fuel tank and/or a fuel pump. The canister 308 may also define one or more fuel return ports 321 to direct injector-bled fuel 346 returned from the engine 334 into the second central cavity 118 to be filtered.

In some implementations, the standpipe assembly 350 is at least partially disposed within the internal chamber 306 of the housing 100. The standpipe assembly 350 includes an elongated standpipe member 352 centrally located within the housing 100 and axially extending upward or away from the bottom second end 304 of the housing 100 and through outer standpipe opening 158 formed through the second end cap 14, the intermediate standpipe opening 78 formed through the annular sealing device 70 and the inner standpipe opening 58 formed through the intermediate end cap 14. The standpipe member 352 includes a distal end terminating within the first central cavity 18 of the filter element 10 that defines a fuel outlet port 330 for directing filtered fuel 332 upon passing through the first filter media 16. The fuel outlet port 330 directs the filtered fuel 332 out of the housing 100 to the engine 334 downstream of the filter assembly 300. Accordingly, the unfiltered fuel 322 is received by the internal chamber 308 of the housing 306 through the one or more inlet ports 320 and the unfiltered fuel 322 may pass through the first filter media 16 at the outer periphery 44 and exit the inner periphery 42 as filtered fuel 332 within the first central cavity 18. Additionally, filtered injector-bled fuel 348 is received by the internal chamber 308 of the housing 100 upon passing through the second filter media 116 at the outer periphery 144. For example, the intermediate outer peripheral wall 54 and the second outer peripheral wall 154 each bounding the outer periphery 144 of the second filter media 116 may define a gap 145 to permit the injector-bled fuel 348 filtered by the second filter media 116 to pass into the internal chamber 308 and enter the first filter media 16 at the outer periphery 44. In doing so, the filtered injector-bled fuel 348 exiting the inner periphery 46 may correspond to the filtered fuel 332 within the first central cavity 18 for delivery to the engine 334 via the outlet port 330. In some examples, the support core 17 is disposed within the first central cavity 18 and supports the inner periphery 46 of the first filter media 16. The support core 17 may be formed from cross-members defining a plurality of passages configured to allow the filtered fuel 332 to flow into the first central cavity 18 and exit the filter assembly 300 through the outlet port 330 of the standpipe member 352 after passing through the first filter media 16.

In some implementations, the standpipe assembly 350 includes an intermediate portion 354 that interconnects the elongated standpipe member 352 with a base member 356 having a larger diameter than the standpipe member 354. In some examples, the intermediate portion 354 includes a frusto-conical shape. FIG. 3 shows the intermediate portion 354 partially received by the outer standpipe opening 158 formed through the second end cap 114. The third annular seal 180 disposed on the outer surface of the second end cap 114 may bound the intermediate portion 354 and forms a seal therewith at the outer standpipe opening 158. FIG. 3 also shows the intermediate portion 354 defining one or more fuel return openings 323 for releasing the injector-bled fuel 346 into the second central cavity 118 from the one or more fuel return ports 321.

As the unfiltered fuel 322 and/or the filtered injector-bled fuel 348 rises within the internal chamber 306 toward the first end 314 of the housing during operation of the fuel system (e.g., the fuel supply 324, the filter assembly 300, and the engine 334), air 342 may be pushed axially upward (e.g., relative to the view of FIG. 3) in the internal chamber 306 and may become trapped between the outer surface 30 of the first end cap 12 and the first end 314 of the housing 100. The air-bleed conduit 20 extending axially through the first central cavity 18 may bleed or vent the trapped air 342 out of the housing 100 and back to the fuel supply 324 so that the air 342 is not pushed through the first filter media 16 and delivered to the engine 334 via the fuel outlet port 330. Specifically, the air-bleed conduit 20 may receive the trapped air 342 through the inlet 22 and direct the trapped air 342 out of first distal opening 24 and the outer opening 26 disposed axially below the intermediate end cap 14 and into the vented air chamber 370. Optionally, the trapped air 342 may exit through the outer opening 26 and into the vented air chamber 370 when the first distal opening 24 of the first portion 220 is disposed axially above the intermediate end cap 14. In other configurations, the trapped air 342 may exit through the first distal opening 24 and into the vented air chamber 370 when the outer opening 26 is formed through the intermediate end cap 14 and the first distal opening 24 extends through the outer opening 26.

The vented air chamber 370 may be defined by the standpipe member 352, the outer surface 50 of the intermediate end cap 14, the annular sealing device 70, the first annular seal 80 and the second annular seal 82. In some examples, the diameter of the intermediate standpipe opening 78 is greater than the diameter of the standpipe member 352. An annular divider wall 325 may axially extend upward or away from second end 304 of the housing 100 and into the vented air chamber 370 through the intermediate standpipe opening 78. Here, the annular divider wall 325 and the outer periphery of the elongated standpipe member 352 define one or more air return ports 374 fluidly separate from the fuel outlet port 330 and the fuel return port(s) 321. The air return ports 374 may extend from air openings 372 along the length of the standpipe assembly 350 to the fuel supply 324 disposed outside of the housing 100. The air openings 372 may be defined at a distal end of the annular divider wall 325 within the vented air chamber 370. Accordingly, unfiltered trapped air 342 within the housing 100 may vent or bleed through the air-bleed conduit 20 and into the vented air chamber 370 for return back to the fuel supply 324 via the one or more air return ports 374.

Additionally, the annular divider wall 325 and the intermediate portion 354 of the standpipe assembly 350 may cooperate to define the fuel return ports 321 that extend axially along the standpipe assembly 350 from the second end 304 of the housing 100 to the fuel return openings 323 disposed within the second central cavity 118. FIG. 3 shows the axially extending fuel return ports 321 disposed radially outward from the annular divider wall 325 while the axially extending air return ports 374 are fluidly separate from the fuel return ports 321 and disposed radially inward from the annular divider wall 325.

Figure 4:
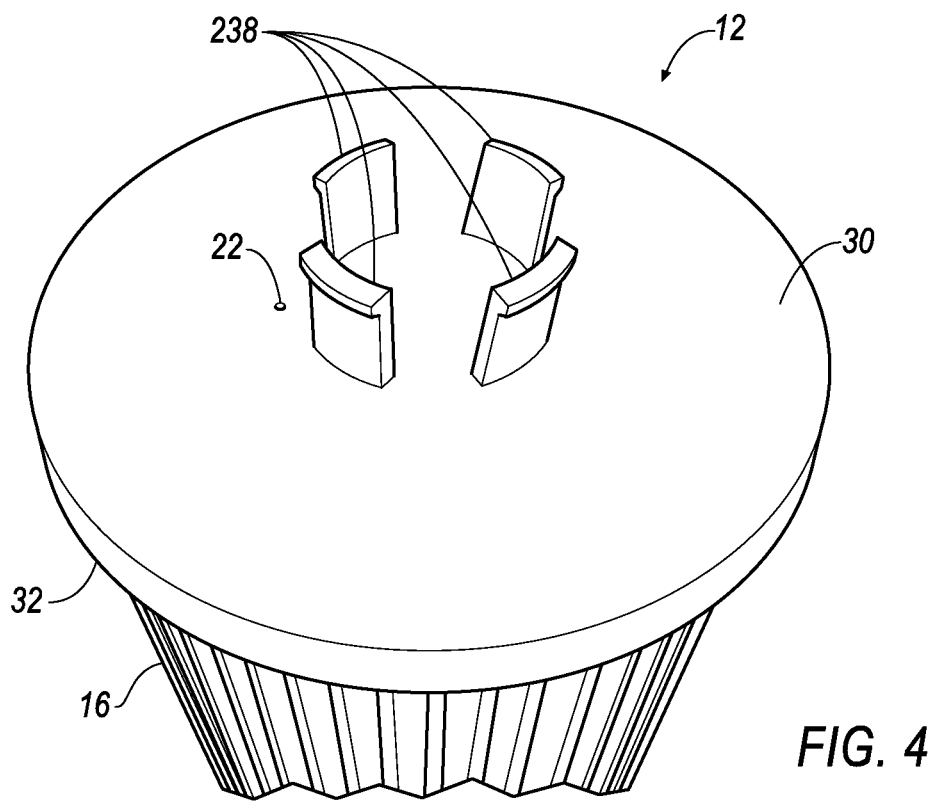
FIG. 4 is a top perspective view of a top end cap of the filter element of FIG. 1 defining an inlet of the air-bleed conduit formed therethrough.
Figure 5:
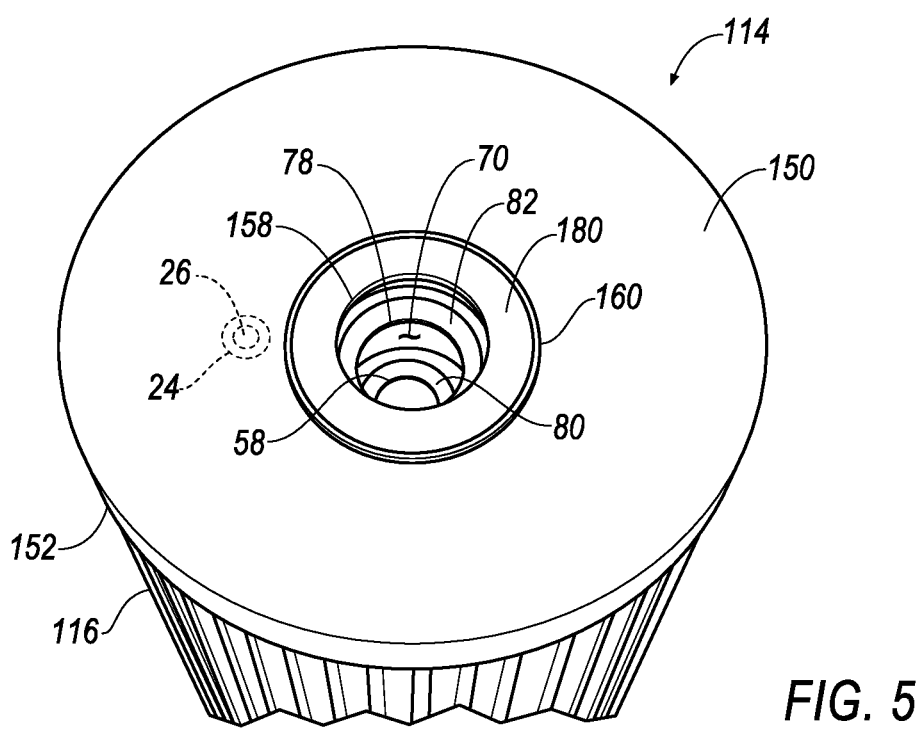
FIG. 5 is a top perspective view of a bottom end cap of the filter element of FIG. 1.

FIGS. 4 and 5 provide a top perspective view (FIG. 4) of the first end cap 12 and a top perspective view (FIG. 5) of the second end cap 114 for the filter element 10 of FIGS. 1-3. FIG. 4 shows the outer surface 30 of the first end cap 12 (e.g., the top end cap relative to the views of FIGS. 1-3) including the one or more fastening members 38 projecting axially upward and the inlet 22 of the air-bleed conduit 20 formed through the first end cap 12. The inlet 22 is located radially inward from the ring of filter media 16. The inner surface 32 of the first end cap 12 is affixed to the first or top end of the first filter media 16.

FIG. 5 shows the outer surface 150 of the second end cap 114 (e.g., the bottom end cap relative to the views of FIGS. 1-3) defining the outer standpipe opening 158 and having the third annular seal 180 disposed thereon. The inner surface 150 of the second end cap 114 is affixed to the bottom end of the second filter media 116 while the top end of the second filter media 116 is affixed to the outer surface 50 of the intermediate end cap 14 (neither shown). FIG. 5 also shows the annular sealing device 70 axially spaced away from the inner surface 152 of the second end cap 114 and defining the intermediate standpipe opening 78 with the second annular seal 82 disposed thereon. The inner standpipe opening 58 formed through the intermediate end cap 14 is coaxial with the outer standpipe opening 158 formed through the second end cap 114 and the intermediate standpipe opening 78 formed through the annular sealing device 70. The first annular seal 80 disposed on the outer surface 50 of the intermediate end cap 14 may bound the inner standpipe opening 58. The vented air chamber 370 is defined between the annular sealing device 70 and the outer surface 50 of the intermediate end cap 14 when the standpipe assembly 350 (not shown) is received by the sealing device 70 and the filter element 10. When the filter element 10 is assembled and the first portion 220 and the second portion 240 are fluidly connected (as shown in FIG. 3), the inlet 22 formed through the first end cap 12 (FIG. 4), the outer opening 26 extending through the intermediate end cap 14, and the first distal opening 24 of the first portion 220 are coaxial with each other.

Figure 6:
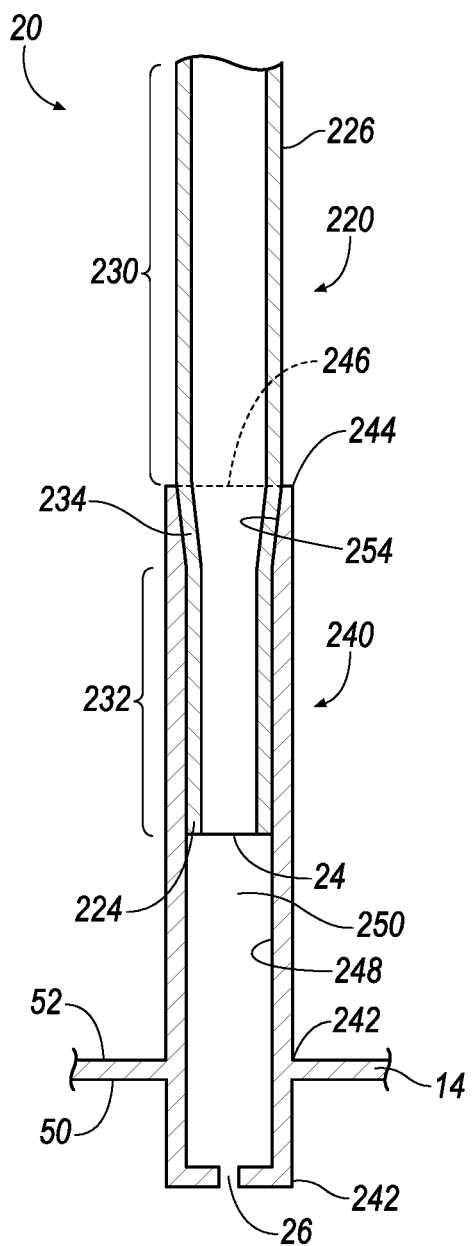
FIG. 6 is a detailed schematic view enclosed within area 6, 7 of FIG. 1 showing a second portion of the air-bleed conduit receiving a first portion of the air-bleed conduit to fluidly connect the first portion and the second portion together.

Referring to FIG. 6, in some implementations, the first portion 220 and the second portion 240 of the air-bleed conduit 20 fluidly connect together to form the air-bleed conduit 20 when the receiving passage 250 of the second portion 240 receives the insertion section 232 of the outer surface 226 of the first portion 220. Optionally, the fluid connection is substantially a fluid tight connection. Accordingly, the first portion 220 may correspond to a male portion and the second portion 240 may correspond to a female portion. Conversely to the examples of FIGS. 1-3 showing the first distal end 224 of the first portion 220 extending through the intermediate end cap 14, FIG. 6 shows the first distal end 224 of the first portion 220 within the receiving passage 250 of the second portion 240 without extending through the intermediate end cap 14. In this example, the first distal opening 24 defined by the first distal end 224 of the first portion 220 provides fluid communication between the inlet 22 formed through the first end cap 12 (neither shown) and the outer opening 26 extending through the second end cap 14 axially below or away from the outer surface 50 of the intermediate end cap 14. As described in the foregoing, the frusto-conical tapered section 254 of the second portion 240 and the intermediate frusto-conical section 234 of the first portion 220 may cooperate to form a seal, and thereby fluidly connect the first portion 220 and the second portion 240 together, such that air and/or filtered fuel 332 within the first central cavity 18 is prevented from entering the air-bleed conduit 20. The geometry of the first portion 220 and the second portion 240 may be reversed without departing from the scope of the present disclosure.

Figure 7:
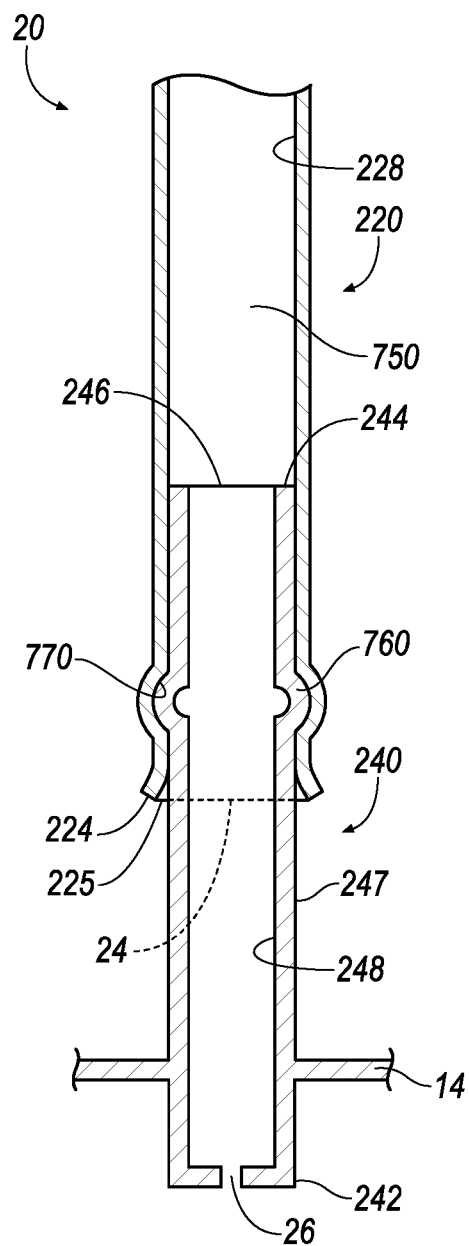
FIG. 7 is a detailed schematic view within area 6,7 of FIG. 1 showing various alternative embodiments of a first portion of the air-bleed conduit receiving a second portion of the air-bleed conduit to fluidly connect the first portion and the second portion together.

Referring to FIG. 7, in some implementations, the inner surface 228 of the first portion 220 defines a receiving passage 750 configured to receive the outer surface 247 of the second portion 240. In these implementations, the first portion 220 and the second portion 240 fluidly connect together to form the air-bleed conduit 20 when the receiving passage 750 of the first portion 220 receives the outer surface 247 of the second portion 240. In some examples, the first distal end 224 of the first portion 220 slants radially outward to assist with guiding the second proximal end 244 of the second portion 240 into the receiving passage 750. Additionally, slanting the first distal end 224 of the first portion 220 radially outward helps prevent the first distal end 224 and the second distal end 244 from interfering with each other in a manner that would inhibit the ability of the receiving passage 750 to receive the outer surface 247 of the second portion 240 during assembly of the filter element 10. The first distal end 224 may be formed from a compressible and resilient material at location 225 to enable the first distal end 224 to flex or compress radially outward in the event the first distal end 224 contacts the second distal end 244 of the second portion 224 when the second distal end 244 inserts into the receiving passage 750.

In some implementations, one or more interference members 760 protrude from the outer surface 247 of the second portion 240 and one or more receiving slots 770 are formed within the inner surface 228 of the receiving portion 750. In these implementations, the receiving slots 770 receive corresponding ones of the interference members 760 to prevent the first portion 220 and the second portion from moving relative to each other when the receiving passage 750 receives the outer surface 247 of the second portion 240. In other words, the interference members 760 and the receiving slots 770 may engage with each other to prevent the first portion 220 and the second portion 240 from fluidly disconnecting. Additionally, the interference members 760 and the receiving slots 770 may cooperate to provide a seal within the receiving passage 750 between the inner surface 228 of the first portion 220 and the outer surface 247 of the second portion 240. In other implementations, the one or more interference members 760 protrude from the inner surface 228 of the receiving passage 750 and the one or more corresponding receiving slots 770 are formed within the outer surface 247 of the second portion 240. The interference members 760 and receiving slots 770 may also be incorporated to the air-bleed conduit 20 in the examples of FIGS. 1-3 and 6.

A number of implementations have been described. Nevertheless, it will be understood that various modifications may be made without departing from the spirit and scope of the disclosure. Accordingly, other implementations are within the scope of the following claims.

What is claimed is:

1. A filter element comprising:
a first end cap;
a second end cap;
an intermediate end cap disposed between the first end cap and the second end cap;
a ring of first filter media disposed between the first end cap and the intermediate end cap;
a ring of second filter media disposed between the intermediate end cap and the second end cap; and
a bleed conduit including a first portion integrally formed with the first end cap and a second portion integrally formed with the intermediate end cap, the first portion axially extending from an inlet formed through the first end cap to a first distal end defining a distal opening in fluid communication with the inlet,
wherein the first distal end is disposed between the second end cap and the intermediate end cap.

2. The filter element of claim 1, wherein the first filter media circumscribes a first central cavity and the bleed conduit axially extends through the first central cavity.

3. The filter element of claim 1, wherein the second portion is configured to connect to the first portion thereby forming a conduit for transmitting fluid.

4. The filter element of claim 3, wherein the second portion fluidly connects to the first portion when a receiving passage defined by an inner surface of one of the first portion or the second portion receives an outer surface of the other one of the first portion or the second portion.

5. The filter element of claim 4, wherein:
the receiving passage of the one of the first portion or the second portion includes a frusto-conical tapered section; and
the outer surface of the other one of the first portion or the second portion includes an intermediate frusto-conical section having a geometry configured to insert into and seal against the frusto-conical tapered section of the receiving passage to fluidly connect the second portion to the first portion when the receiving passage of the one of the first portion or the second portion receives the outer surface of the other one of the first portion or the second portion.

6. The filter element of claim 4, further comprising:
one or more interference members protruding radially inward from the inner surface defining the receiving passage of the one of the first portion or the second portion or protruding radially outward from the outer surface of the other one of the first portion or the second portion received by the receiving passage; and
one or more receiving slots formed within the other one of the inner surface defining the receiving passage or the outer surface received by the receiving passage and configured to receive corresponding ones of the interference members to prevent the first portion and the second portion from moving relative to each other when the receiving passage of the one of the first portion or the second portion receives the outer surface of the other one of the first portion or the second portion.

7. The filter element of claim 4, wherein the receiving passage is defined by the inner surface of the second portion that axially extends between an inner opening defined by a second distal end of the second portion and an outer opening extending through the intermediate end cap, wherein the first distal end of the first portion is disposed within the receiving passage of the second portion or axially extends through the outer opening of the receiving passage.

8. The filter element of claim 7, wherein the outer opening of the receiving passage is disposed between the intermediate end cap and the second end cap or formed through the intermediate end cap.

9. The filter element of claim 4, wherein:
the inner surface of the first portion defines the receiving passage extending axially from the first distal opening toward the inlet; and
the second portion axially extends from an outer opening extending through the second end cap to a second distal end, the second distal end disposed within the receiving passage of the first portion and defining an inner opening that provides fluid communication with the inlet formed through the first end cap and the outer opening extending through the second end cap when the first portion and the second portion are fluidly connected.

10. The filter element of claim 1, further comprising:
an annular sealing device extending axially from an outer surface of the intermediate end cap toward the second end cap, the annular sealing device defining a vented fluid chamber in direct fluid communication with the bleed conduit.

11. The filter element of claim 1, further comprising:
a support core disposed in a first central cavity of the first filter media and supporting a first inner periphery associated with the first filter media, wherein the bleed conduit is disposed radially inward from the support core and a second inner periphery associated with the second filter media.

12. A filter assembly comprising:
a filter housing defining an internal chamber between a first end and a second end; and
a filter element disposed within the internal chamber of the filter housing, the filter element comprising:
a first end cap opposing the first end of the filter housing;
a second end cap opposing the second end of the filter housing;
an intermediate end cap disposed between the first end cap and the second end cap;
a ring of first filter media axially extending between the first end cap and the intermediate end cap;
a ring of second filter media axially extending between the intermediate end cap and the second end cap;
a male portion of a bleed conduit integrally formed with the first end cap, the male portion axially extending from an inlet formed through the first end cap to a first distal end defining a distal opening in fluid communication with the inlet; and
a female portion of the bleed conduit fluidly connected to the male portion and integrally formed with the intermediate end cap,
wherein the first distal end is disposed between the second end cap and the intermediate end cap.

13. The filter assembly of claim 12, wherein the male portion and the female portion are coaxial and disposed radially inward from inner peripheries of the first and second filter media.

14. The filter assembly of claim 12, wherein the female portion defines an outer opening extending through the intermediate end cap and a receiving passage axially extending between the outer opening and an inner opening disposed between the first end cap and the intermediate end cap, the receiving passage receiving and forming a seal with an outer surface of the male portion.

15. The filter assembly of claim 12, wherein the filter element further comprises an annular sealing device extending axially from an outer surface of the intermediate end cap toward the second end cap and defining a vented fluid chamber in fluid communication with the bleed conduit, the bleed conduit configured to receive fluid through an inlet defined by the male portion and formed through the first end cap and the bleed conduit configured to direct the received fluid to the vented fluid chamber.

16. The filter assembly of claim 12, wherein
the first filter media is defined by a first outer periphery opposing the internal chamber of the housing and a first inner periphery disposed radially inward from the first outer periphery and opposing a first central cavity, the first central cavity receiving filtered fuel upon passing through the first filter media at the first outer periphery and exiting at the first inner periphery; and
the second filter media is defined by a second outer periphery opposing the internal chamber of the housing and a second inner periphery disposed radially inward from the second outer periphery and opposing a second central cavity, the internal chamber of the housing receiving filtered injector-bled fuel upon passing through the second filter media at the second inner periphery and exiting at the second outer periphery.

17. The filter assembly of claim 16, wherein the filtered fuel passed through the first filter media corresponds to at least one of unfiltered fuel from a fuel system in fluid communication with the internal chamber of the housing or the filtered injector-bled fuel exiting the second filter media at the second outer periphery.

18. A method of manufacturing a filter element comprising:
integrally forming a first end cap with a first portion of a bleed conduit, the first portion axially extending from an inlet formed through the first end cap to a first distal end defining a first distal opening;
providing a second end cap;
integrally forming an intermediate end cap with a second portion of the bleed conduit, the second portion axially extending from an outer opening extending through the intermediate end cap to a second distal end defining an inner opening;
providing a ring of first filter media between the first end cap and the second end cap;
providing a ring of second filter media between the intermediate end cap and the second end cap;
affixing one of the intermediate end cap to the first filter media or the first end cap to the first filter media;
fluidly connecting the first portion and the second portion of the bleed conduit together;
affixing the other one of the first end cap to the first filter media or the intermediate end cap to the first filter media; and
affixing the second filter media to the second end cap and the second filter media to the intermediate end cap,
wherein affixing the other one of the first end cap to the first filter media or the intermediate end cap to the first filter media includes positioning the first distal end of the first portion of the bleed conduit between the second end cap and the intermediate end cap.

19. The method of claim 18, wherein the step of fluidly connecting the first portion and the second portion of the bleed conduit together comprises:
when the intermediate end cap is affixed to a first bottom end of the first filter media with the second portion of the bleed conduit extending axially into a first central cavity:
positioning the first end cap to place the first portion of the bleed conduit in coaxial alignment with the second portion of the bleed conduit;
inserting one of the first distal end of the first portion into the inner opening of the second portion or the second distal end of the second portion into the first distal opening of the first portion; and
pressing the first portion and the second portion of the bleed conduit together to form a seal between an outer surface of the first portion and an inner surface of the second portion or between an inner surface of the first portion and an outer surface of the second portion.

20. The method of claim 18, further comprising:
affixing an annular sealing device to the intermediate end cap on an opposite side of the intermediate end cap than the first filter media, the affixed annular sealing device defining a vented air chamber configured to receive fluid vented through the bleed conduit from the inlet formed through the first end cap.

* * * * *